US011912241B2

United States Patent
Christensen et al.

(10) Patent No.: US 11,912,241 B2
(45) Date of Patent: Feb. 27, 2024

(54) LOAD CARRIER FOOT

(71) Applicant: Thule Sweden AB, Hillerstorp (SE)

(72) Inventors: Jens Christensen, Värnamo (SE);
Markus Nordangard, Värnamo (SE);
Peter Wikstrom, Skillingaryd (SE)

(73) Assignee: Thule Sweden AB, Hillerstorp (SE)

( * ) Notice: Subject to any disclaimer, the term of this patent is extended or adjusted under 35 U.S.C. 154(b) by 91 days.

(21) Appl. No.: 17/620,501

(22) PCT Filed: Aug. 21, 2020

(86) PCT No.: PCT/EP2020/073456
§ 371 (c)(1),
(2) Date: Dec. 17, 2021

(87) PCT Pub. No.: WO2021/037701
PCT Pub. Date: Mar. 4, 2021

(65) Prior Publication Data
US 2022/0340086 A1    Oct. 27, 2022

(30) Foreign Application Priority Data

Aug. 23, 2019  (EP) .................................. 19193343

(51) Int. Cl.
*B60R 9/048*  (2006.01)
*B60R 9/058*  (2006.01)
*B60R 9/052*  (2006.01)

(52) U.S. Cl.
CPC .............. *B60R 9/048* (2013.01); *B60R 9/052* (2013.01); *B60R 9/058* (2013.01)

(58) Field of Classification Search
CPC ......... B60R 9/052; B60R 9/048; B60R 9/058; E05B 65/006; E05B 65/465; E05B 65/5246; E05B 65/5253
(Continued)

(56) References Cited

U.S. PATENT DOCUMENTS 1,212,878 A * 1/1917 Augenbraun ........ B65D 50/068
70/168
2,154,118 A * 4/1939 Ames ................. B60K 15/0409
70/168

(Continued)

FOREIGN PATENT DOCUMENTS

DE    20 2019 100 142 U1    1/2019
EP         0 091 889 A2    10/1983
(Continued)

OTHER PUBLICATIONS

International Search Report of the International Searching Authority in International Application No. PCT/EP2020/073456, dated Sep. 11, 2020 (2 pages).

*Primary Examiner* — Scott T McNurlen
(74) *Attorney, Agent, or Firm* — Sterne, Kessler, Goldstein & Fox P.L.L.C.

(57) ABSTRACT

A load carrier foot for attaching a load carrying portion, preferably a profile element, to a vehicle. The load carrier foot includes a base portion, a cover portion, a lock for locking the cover portion to the base portion at a first position, and a fixing mechanism for fixing the cover portion to the base portion at a second position spaced from the first position. The fixing mechanism is releasable by opening the lock.

19 Claims, 4 Drawing Sheets

(58) Field of Classification Search
USPC ....... 224/325–326, 329–331; 70/6, 7, 77–78, 70/85–86
See application file for complete search history.

(56) References Cited

U.S. PATENT DOCUMENTS

| | | | |
|---|---|---|---|
| 2,800,090 A * | 7/1957 | Reid | E05G 1/02 70/168 |
| 4,640,450 A * | 2/1987 | Gallion | B60R 9/058 224/315 |
| 4,728,019 A | 3/1988 | Olliges | |
| 8,104,651 B2 * | 1/2012 | Bingham | B60R 9/058 224/322 |
| 11,312,312 B2 * | 4/2022 | Yang | B60R 9/052 |
| 2004/0118886 A1 * | 6/2004 | Mirshafiee | B60R 9/045 224/315 |

FOREIGN PATENT DOCUMENTS

| | | | | |
|---|---|---|---|---|
| EP | 2322382 A1 * | 5/2011 | | B60R 9/055 |
| KR | 101479869 B1 * | 1/2015 | | |
| KR | 101676596 B1 * | 11/2016 | | |

\* cited by examiner

LOAD CARRIER FOOT

TECHNICAL FIELD

The present invention relates to a load carrier foot for attaching a load carrying portion to a vehicle. The load carrying portion may be a profile element, e.g. a cross bar. Furthermore, the present invention relates to a load carrier comprising such a load carrier foot. The load carrier by be a roof rack.

PRIOR ART

A roof rack comprises a set of bars securable to the roof of a vehicle. It may be used to carry bulky items, such as luggage, bicycles, canoes, kayaks, skies, or various carriers and containers. The roof rack usually comprises a cross bar, which extends across the roof in widthwise direction of the vehicle. The cross bar may be mounted to the vehicle roof via a roof rack foot. If the vehicle roof does not provide any kind of fixation means, e.g. a roof rail, the roof rack foot may be a clamp-rack type, which can be clamped between the roof and an opening of the door. Alternatively, the roof rack foot may be of a raised-rail or of a flush-rail type, which may be clamped onto a rail extending in the longitudinal direction of the vehicle. The raised rail is provided spaced apart from the vehicle roof, whereas the flush rail extends in close proximity to the roof and/or is even integrated therein. The roof rack foot may be mounted to the vehicle by actuating an actuation mechanism, wherein the actuation mechanism may be covered by a cover portion. For prohibiting an unwanted actuation of the actuation mechanism, e.g. for preventing theft of the roof rack, the cover portion may be locked to the roof rack foot via a lock.

SUMMARY OF THE INVENTION

The present invention relates to a load carrier foot for attaching a load carrying portion to a vehicle. The vehicle may be a passenger vehicle or a commercial vehicle. The load carrier foot may be a roof rack foot for securing the load carrying portion to the roof of a vehicle. Alternatively or additionally, the load carrier foot may be suitable for securing the load carrying portion to a loading platform of a vehicle, e.g. to a loading platform of a pickup truck. The load carrying portion may be a profile element having a longitudinal direction, which is its main extension direction that is significantly longer than the extension in any of the other directions of the profile element. The profile element may be a cross bar, which extends across the vehicle in widthwise direction when mounted to the vehicle in the intended fashion. The load carrier foot comprises a base portion, a cover portion, a lock for locking the cover portion to the base portion at a first position and a fixing mechanism for fixing the cover portion to the base portion at a second position. The base portion and the cover portion may be respectively formed as a single part or from multiple parts, which are connected to each other.

The lock may be actuatable by a key. Alternatively or additionally, the lock may be an electronic lock, which is actuatable electronically, e.g. via a smartphone, or an arbitrary other lock. With the lock, an arbitrary device covered by the cover portion may be protected to avoid an undesired access thereto, e.g. by strangers. The load carrier foot of the present invention is configured such that the first position, at which the cover portion is lockable to the base portion via the lock, is spaced apart from the second position, at which the cover portion is fixable to the base portion via the fixing mechanism. Thus, the cover portion of the load carrier foot of the present invention may be fastened to the base portion at two positions, which are spaced apart from each other. The lock and the fixing mechanism may be provided symmetrically to each other with respect to a symmetry axis of the load carrier foot. According to an embodiment, the first and the second positions are provided at areas of the cover portion, which are maximally spaced apart from each other. The lock may be positioned off-center for avoiding any collision with a device positioned behind the cover portion. By providing the lock and the fixing mechanism at two different positions, the cover portion may be securely fastened to the base portion, as e.g. a bending up of the cover portion to gain access to a device situated behind it may be prevented effectively.

The load carrier foot of the present invention is configured such that the fixing mechanism is releasable by opening the lock. Preferably, the fixing mechanism is releasable by only opening the lock without conducting any further activities. Thus, by opening the lock, the cover portion may be disengaged from the base portion although being fastened to the base portion at two different positions. Therefore, the load carrier foot of the present invention exhibits a high security as it allows for connection of the cover portion to the base portion at multiple positions, at the same time allowing for a simple and efficient removal of the cover portion from the base portion.

According to an embodiment, the fixing mechanism comprises a hook and a latch. The hook is engaged with the latch when the fixing mechanism is engaged. By opening the lock, the hook is disengaged from the latch, thereby releasing the fixing mechanism. Preferably, the hook is provided at the cover portion and the latch is provided at the base portion. However, also a reversed configuration is conceivable. The load carrier foot according to this embodiment is reliable, cost-efficient and easy to use. However, it is also possible that the fixing mechanism is constructed differently. For example, the fixing mechanism may comprise magnets for connecting the cover portion to the base portion at the second position, may be electronically actuated and/or may exhibit an arbitrary other configuration.

According to an embodiment, the first position, at which the cover portion is lockable to the base portion via the lock, and the second position, at which the cover portion is fixable to the base portion via the fixing mechanism, are provided at opposite side portions of the load carrier foot in width direction thereof. The load carrier foot comprises a height direction, which may extend parallel to the height direction of the vehicle when the load carrier foot is mounted thereto in the intended fashion. The width direction of the load carrier foot may extend perpendicular to the height direction and parallel to the length direction of the vehicle when the load carrier foot is mounted thereto in the intended fashion. The length direction of the load carrier foot may correspond to the length direction of the load carrying portion and may be oriented perpendicular to the width and height directions. The length direction of the load carrier foot may extend in the width direction of the vehicle when the load carrier foot is mounted thereto in the intended fashion. Furthermore, preferably, the first and second positions are provided at the bottom portion of the load carrier foot in height direction, wherein the cover portion preferably exhibits an increasing width from the top portion to the bottom portion in height direction thereof. This embodiment results in a load carrier foot with good accessibility due to the relatively large cover portion, at the same time exhibiting high safety, as those portions of the cover portion, which may exhibit some kind of flexibility to bend them away from the base portion, are fixated by the lock and the fixing mechanism.

According to an embodiment, the cover portion is shifted sideways with respect to the base portion, preferably in the width direction of the load carrier foot, to release the fixing mechanism by opening the lock. According to an embodiment, only the bottom portion of the cover portion is shifted sideways, whereas the top portion of the cover portion does not exhibit any movability in widthwise direction when being mounted to the base portion in the intended fashion. The load carrier foot according to this embodiment exhibits low complexity and high reliability.

For providing the sideway shiftability, the lock may be rotatably supported in the cover portion and comprise an eccentric portion. The load carrier foot may be configured such that the eccentric portion of the lock, which is rotatably supported in the cover portion, is guided by a guide surface of the base portion for shifting the cover portion sideways by opening the lock. This sideway shifting of the cover portion may release the fixing mechanism. In other words, the eccentric portion of the lock may be in engagement with a guide surface of the base portion, wherein said guide surface guides the eccentric portion of the lock and thus the cover portion, in which the lock is supported, upon turning of the lock. Said guidance may be such that the cover portion is shifted sideways with respect to the base portion when the lock is opened. Preferably, only the bottom portion of the cover portion is shifted sideways with respect to the bottom portion of the base portion, whereas the top portions of the cover portion and the base portion are kept stationary with respect each other. This embodiment allows for an easy and simple release of the fixing mechanism by opening the lock. Furthermore, it is also possible that the eccentric portion is provided by the base portion, wherein the cover portion comprises a corresponding guide surface.

Furthermore, it is possible that the load carrier foot is configured such that the eccentric portion of the lock is guided by the guide surface of the base portion to shift the cover portion sideways with respect to the base portion to engage the fixing mechanism by closing the lock. According to an embodiment, only the bottom portion of the cover portion is shifted sideways by closing the lock. The sideway shifting of the cover portion during closing of the lock may be in a direction opposite to the sideway shifting of the cover portion during opening of the lock. According to this embodiment, the cover portion may be easily and comfortably attached to and released from the base portion via the lock and the fixing mechanism by merely actuating the lock.

According to an embodiment, the load carrier foot comprises a linkage, which is preferably configured to guide the sideways movement of the cover portion when opening and/or closing the lock. The linkage may be provided as an alternative or in addition to the eccentric portion and the guide surface described above. The linkage may exhibit an arbitrary configuration.

According to an embodiment, the load carrier foot is configured such that the lock must be closed to align the cover portion and the base portion with respect to each other. The load carrier foot may be configured such that the cover portion and the base portion may be only aligned with respect to each other if the lock is in a closed state and the fixing mechanism is engaged. According to an embodiment, this is achieved by respectively matching the configurations of the eccentric portion and the guide surface described above with respect to each other. This embodiment provides the advantage that a user of the load carrier foot is visually informed if the load carrier foot is unlocked through a misalignment between the cover portion and the base portion. Accordingly, this configuration encourages a user to lock the load carrier foot.

According to an embodiment, the top portions of the cover portion and the base portion are not movable with respect to each other in width direction of the load carrier foot when the cover portion is attached to the base portion in the intended fashion. This may be achieved by forming one of the top portions of the cover portion and the base portion to be slidable into the other one of the top portions of the cover portion and the base portion. By preventing a relative movement of the top portions of the cover portion and the base portion in widthwise direction of the load carrier foot, reliability and robustness of the load carrier foot may be increased. Furthermore, the top portions of the cover portion and the base portion, which may be slid into each other, may be configured to accommodate an end portion of the load carrying portion. Therefore, a support for the load carrying portion can be provided in a compact and low complex way. Preferably, the cover portion and the base portion are slidable into each other in longitudinal direction of the load carrier foot.

According to an embodiment, one of the base portion and the cover portion comprises a projection insertable into a complementary groove of the other one of the base portion and the cover portion to prevent a relative movement of both portions in height direction of the load carrier foot. The projection and the groove may be provided at an end portion of the load carrier foot in longitudinal direction, said end portion facing away from the cover portion. This embodiment provides a load carrier foot in which the cover portion may be supported at the base portion with high reliability, resulting in a particularly robust load carrier foot.

According to an embodiment, the load carrier foot is configured such that, when the lock is in an open state, the cover portion can be detached from the base portion by only a translational pulling movement. In other words, only by pulling the cover portion, it can be detached from the base portion, although it may be fixed to the base portion at two positions spaced apart from each other. Preferably, the pulling movement is directed in a direction parallel to the longitudinal direction of the load carrier foot. In particular, according to this embodiment, no turning or twisting movement of the cover portion for removal thereof from the base portion is necessary. Thus, this embodiment provides a load carrier foot which is very user friendly and easy to operate.

According to an embodiment, the load carrier foot comprises an adjustment mechanism with an actuation device, wherein the load carrier foot can be secured to the vehicle by operating the adjustment mechanism. The adjustment mechanism may be a screw that can be actuated by a tool, e.g. a screwdriver. Alternatively or additionally, the actuation device may comprise a turning knob, which can be actuated without any tools by a user. It may also exhibit an arbitrary other configuration. According to this embodiment, the cover portion covers the actuation device when being attached to the base portion in the intended fashion. The load carrier foot may further comprise a first and a second clamping portion, wherein a roof rail of the vehicle can be clamped between the first and second clamping portions by operating the adjustment mechanism via the actuation device. The load carrier foot may be of a raised-rail or a flush-rail type configuration as described above. Alternatively, the load carrier foot may be of an arbitrary other configuration, e.g. of a clamp-rack type configuration as described above.

The present invention further relates to a load carrier for a vehicle comprising a load carrying portion and at least one load carrier foot according to one of the above described embodiments. Preferably, the load carrier foot is a roof rack foot. The load carrier may comprise a cross bar and two load carrier feet according to one of the above described embodiments, which can be mounted to each end of the cross bar. Furthermore, the load carrier may comprise two of such cross bars and four of such load carrier feet.

DETAILED DESCRIPTION OF EMBODIMENTS

Figure 1:
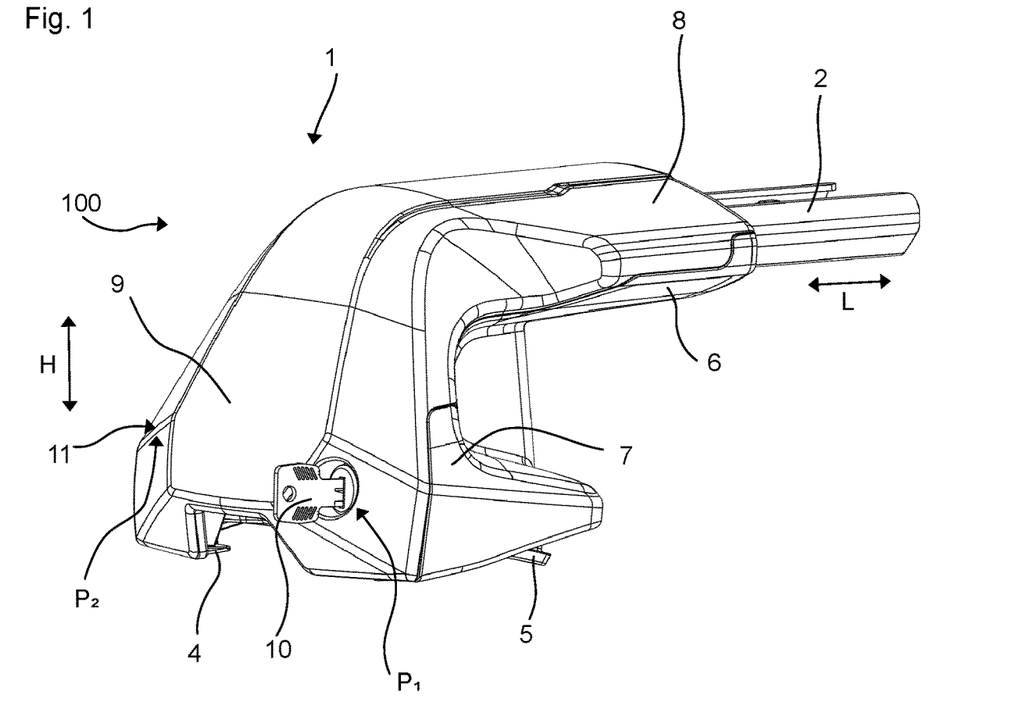
FIG. 1 shows a load carrier foot in a first perspective side view according to an embodiment of the present invention.
Figure 2:
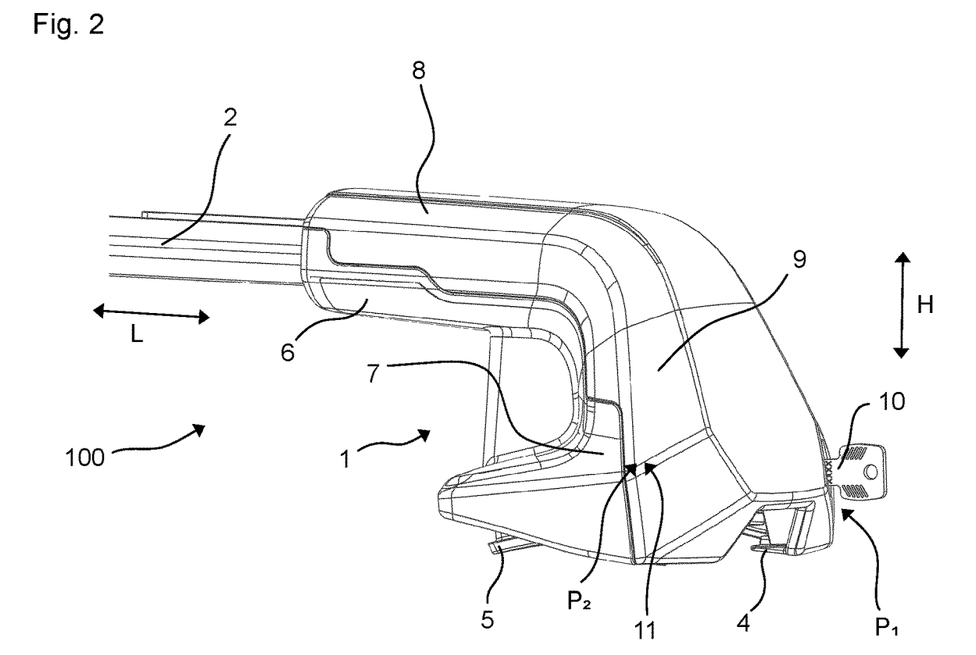
FIG. 2 shows the load carrier foot of FIG. 1 in a further perspective side view.
Figure 4:
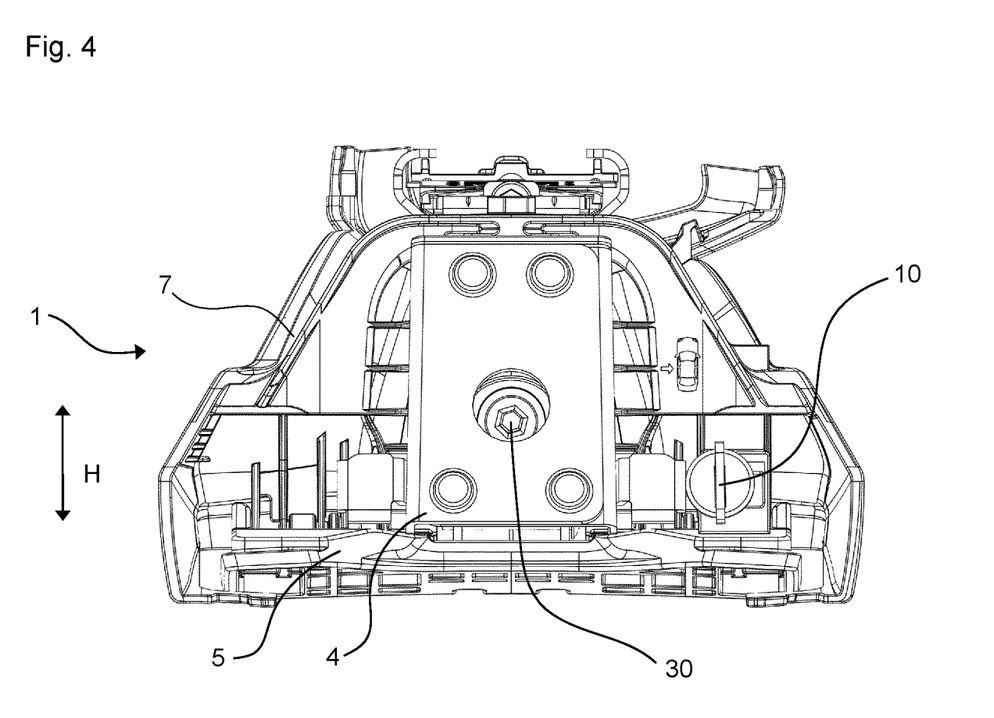
FIG. 4 shows a front view of the load carrier foot of FIGS. 1 and 2 with the cover portion removed.

FIGS. 1 and 2 shows a load carrier 100 comprising a load carrier foot 1 and a load carrying portion 2. In the present embodiment, the load carrier 100 comprises two load carrier feet 1, one load carrier foot 1 being respectively attached to an end portion of the load carrying portion 2. In FIGS. 1 and 2, only one load carrier foot 1 is shown. The load carrying portion 2 constitutes a cross bar for extending from the right to the left side across the roof of a vehicle. To the cross bar 2, a bike carrier, a roof box and/or other auxiliary equipment may be attached. The load carrier foot 1 comprises an adjustment mechanism 30, which is shown in FIG. 4. By operating the adjustment mechanism 30, the load carrier foot 1 can be mounted to the roof of a vehicle. In the present embodiment, the load carrier foot 1 comprises first and second clamping portions 4, 5, which may be moved relatively to each other by operating the adjustment mechanism 30 to clamp a roof rail (not shown) provided on top of the roof of the vehicle therebetween. In the height direction H of the load carrier foot 1, the first and second clamping portions 4, 5 are provided at the bottom and an opening for accommodating the load carrying portion 2 is provided at the top of the load carrier foot 1.

The load carrier foot 1 exhibits a substantially L-shape with a long leg substantially extending in the length direction L of the load carrying portion 2, and a short leg substantially extending in the height direction H of the load carrier foot 1. The load carrier foot 1 comprises a base portion 6, 7 and a cover portion 8, 9, which respectively exhibit a substantially L-shape. The base portion comprises a long leg 6, which extends in the length direction L of the load carrying portion 2, and a short leg 7, which substantially extends in the height direction H of the load carrier foot 1, when the load carrier 100 is mounted to the roof of the vehicle in its intended fashion. Likewise, the cover portion exhibits a long leg 8, which extends in the length direction L of the load carrying portion 2, and a short leg 9, which substantially extends in the height direction H of the load carrier 100, when the load carrier 100 is mounted to the roof of the vehicle in its intended fashion. As derivable from FIGS. 1-2 and 5-6, the base portion 6, 7 and the cover portion 8, 9 are formed complementary to each other to allow for a joining of both elements to form a free space for accommodating the clamping portions 4, 5 and the adjustment mechanism 30 within the short legs of the base portion 7 and the cover portion 9, and for accommodating the load carrying portion 2 within the long legs of the base portion 6 and the cover portion 8.

Figure 5:
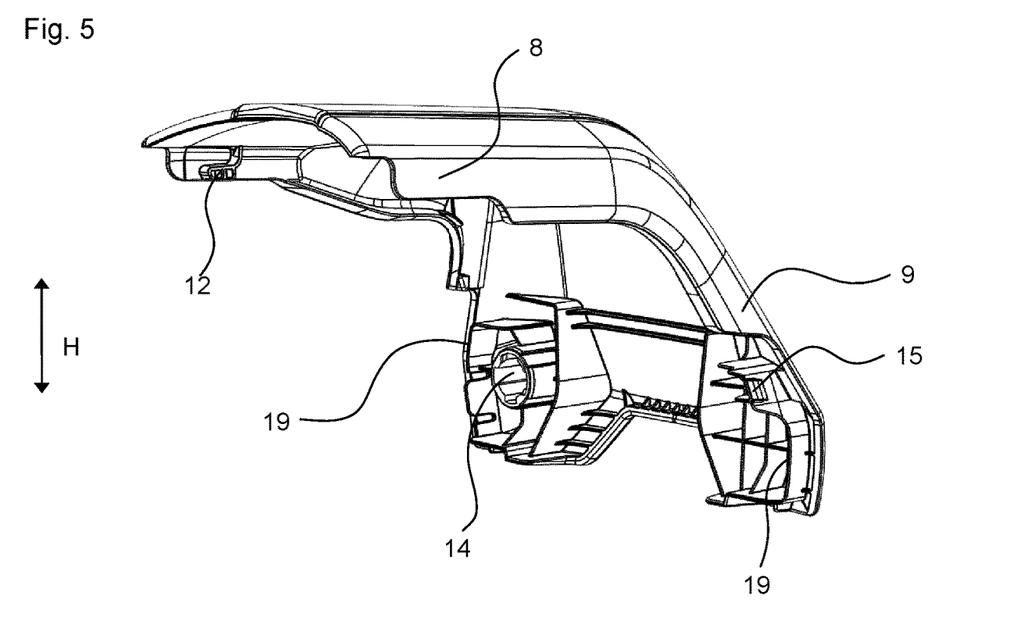
FIG. 5 shows the cover portion of the load carrier foot of FIGS. 1 and 2 in a perspective side view.
Figure 6:
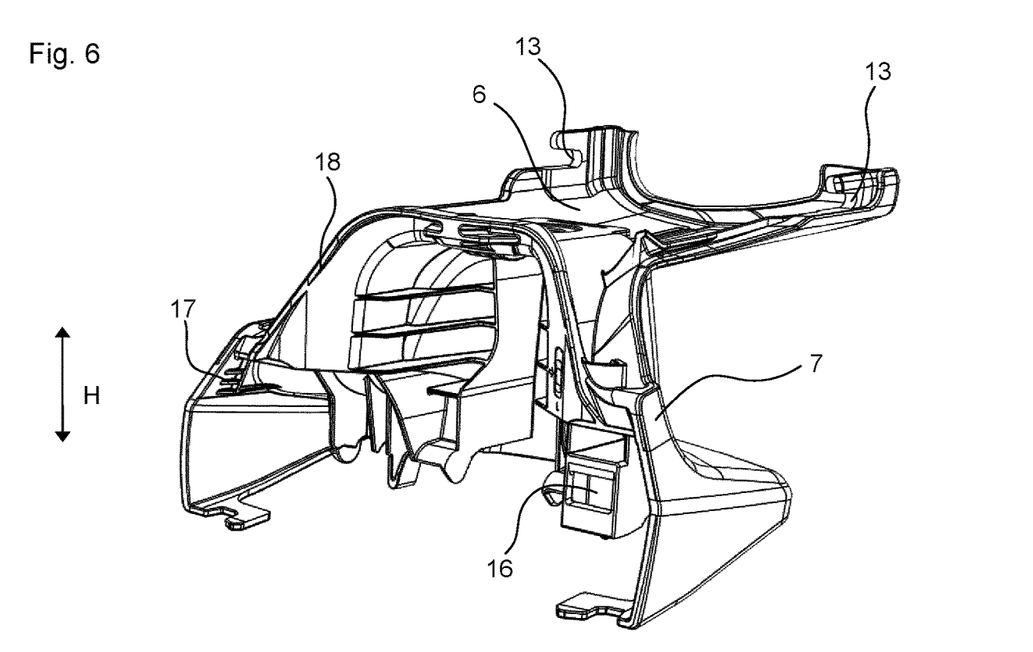
FIG. 6 shows the base portion of the load carrier foot of FIGS. 1 and 2 in a perspective side view.

Specifically, as shown in FIGS. 5 and 6, the short leg of the base portion 7 forms a free space for accommodating the adjustment mechanism 30 and the first and second clamping portions 4, 5, wherein said free space is bordered by side walls and a top wall, which together form an abutment surface 18. Furthermore, on the inside of the short leg of the cover portion 9, an engagement surface 19 is formed, said engagement surface 19 being configured to engage with the abutment surface 18 to close the free space formed by the side walls and the top wall of short leg of the base portion 7. In addition, the long leg of the base portion 6 exhibits at the end, which is situated away from the short leg of the base portion 7, a groove 13 on each side of the base portion 6 in width direction Q of the load carrier foot 1, the grooves 13 opening up towards the short leg of the base portion 7 and extending in the length direction L of the load carrying portion 2 when the load carrier 100 is mounted to the roof of the vehicle in the intended fashion. The cover portion, namely the long leg of the cover portion 8, exhibits a protrusion 12 on the inside of each side surface of the long leg of the cover portion 8. The protrusions 12 of the cover portion 8 are formed complementary to the grooves 13 of the base portion 6.

By moving the cover portion 8, 9 in the length direction L of the load carrying portion 2, the protrusions 12 of the long leg of the cover portion 8 can be inserted into the grooves 13 of the long leg of the base portion 6 while bringing the engagement surface 19 of the short leg of the cover portion 9 into engagement with the abutment surface 18 of the short leg of the base portion 7. Furthermore, in this assembled state, an opening for accommodating the load carrying portion 2 is formed at the end of the long leg of the load carrier foot 1 facing away from the short leg of the load carrier foot 1. This opening is formed between a bottom surface formed by the long leg of the base portion 6, a top surface formed by the long leg of the cover portion 8 and two side surfaces formed by the grooves 13 of the long leg of the base portion 6 engaged with the protrusions 12 formed by the long leg of the cover portion 8.

As described above, the top portions of the base portion and the cover portion can be slid into each other via the grooves 13 and the protrusions 12 to fix a positional relationship of both parts with respect to each other in height direction H. Furthermore, the cover portion, namely the long leg of the cover portion 8, exhibits side surfaces which abut with side surfaces of the long leg of the base portion 6 to fix a positional relationship of the top portions of both parts in width direction Q of the load carrier foot 1.

The load carrier foot 1 further comprises a lock 10 and a fixing mechanism 11 for locking the cover portion, namely the short leg of the cover portion 9, to the base portion, namely the short leg of the base portion 7. The lock 10 and the fixing mechanism 11 are provided at opposite sides of the load carrier foot 1 in width direction Q. As derivable from FIG. 3, they are provided at the bottom portion of the load carrier foot 1 in height direction H thereof. Specifically, the short leg of the base portion 7 and the short leg of the cover portion 9 exhibit an increasing width (extension in direction Q) from the top portion towards the bottom portion of the load carrier foot 1. The lock 10 is provided at the bottom right hand corner and the fixing mechanism 11 at the bottom left hand corner of the load carrier foot 1. Via the lock 10, the cover portion 9 may be fixed to the base portion 7 at a first position $P_1$ and via the fixing mechanism at a second position $P_2$.

Figure 3:
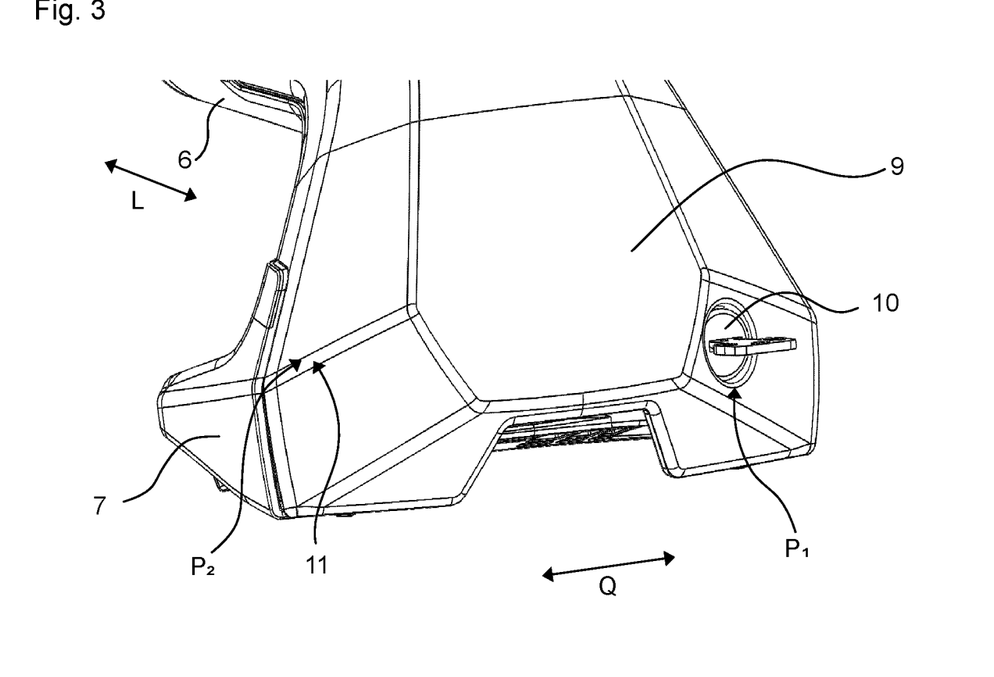
FIG. 3 shows a front view of the load carrier foot of FIGS. 1 and 2 with the cover portion attached.

The load carrier foot 1 is configured such that the fixing mechanism 11 may be released by merely opening the lock 10. More precisely, by unlocking the lock 10, the fixing mechanism 11 is disengaged such that the cover portion 8, 9 can be detached from the base portion 6, 7 by a translational pulling movement in the length direction L of the load carrying portion 2. Specifically, no twisting movement of the cover portion for detachment thereof is necessary, thereby simplifying exposure of the adjustment mechanism 30 for an operator.

As shown in FIG. 6, the fixing mechanism 11 of the load carrier foot 1 comprises a latch 17, which is provided at the bottom left hand corner of the short leg of the base portion 7. The short leg of the cover portion 9 exhibits a hook 15 at the bottom left hand corner, as derivable from FIG. 5. Furthermore, as derivable from FIG. 9, the latch 17 of the base portion 7 and the hook 15 of the cover portion 9 are engageable with each other for preventing a movement of the cover portion 9 with respect to the base portion 7 in the longitudinal direction L of the load carrying portion 2. The load carrier foot 1 is configured such that the fixing mechanism 11 is an engaged state when the base portion 6, 7 and the cover portion 8, 9 are aligned with respect to each other and the lock 10 is in a locked state. By turning the lock 10 to an unlocked state, the cover portion, namely the bottom portion of the short leg of the cover portion 9, is shifted sideways in the width direction Q with respect to the short leg of the base portion 7, while the top portions of the base portion and the cover portion, namely the long legs of the base portion and the cover portion 6, 8, are not moved with respect to each other. By the sideways movement of the bottom portion of the cover portion 9, the latch 17 and the hook 15 are disengaged, thereby allowing for a translational backwards movement of the cover portion 9 with respect to the base portion 7 in the length direction L.

Figure 7A:
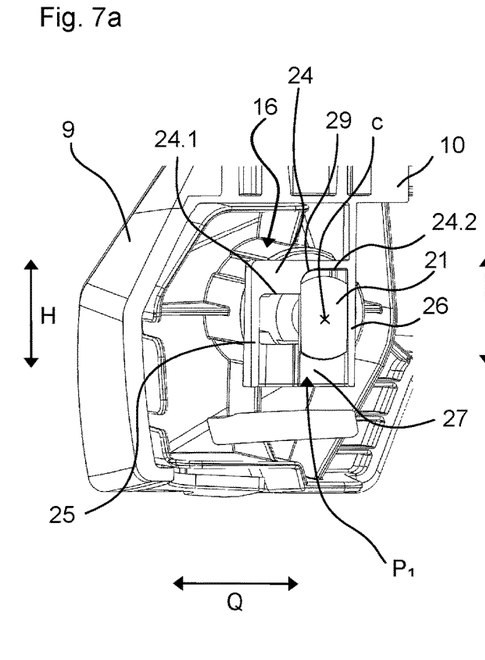
FIGS. 7a and 7b schematic show a partial sectional view of the load carrier foot of FIGS. 1 and 2 for explaining the locking mechanism of the cover portion.
Figure 7B:
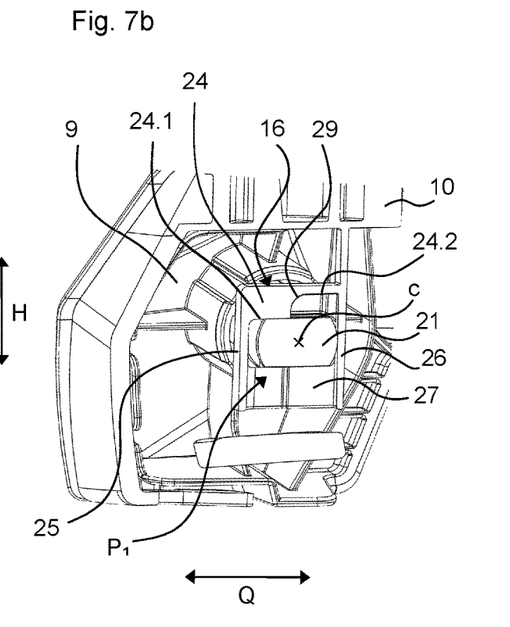
Figure 8:
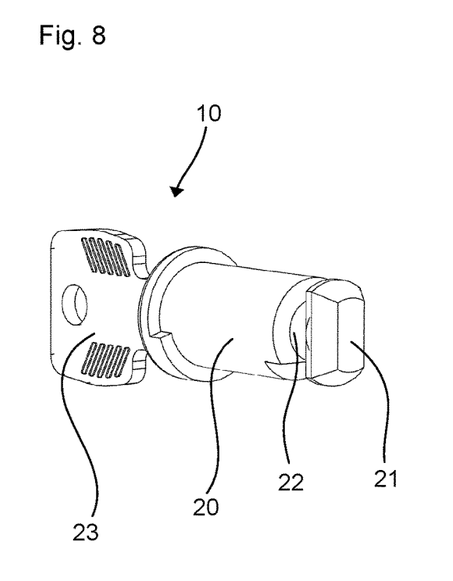
FIG. 8 shows a lock of the load carrier foot of FIGS. 1 and 2.

As derivable from FIG. 8, the lock 10 comprises a cylindric main body 20 and an eccentric top portion 21, wherein a step 22 is formed therebetween. At the end of the cylindric main body 20 facing away from the cylindric top portion 21, a keyhole for a key 23 is provided. The eccentric top portion 21 exhibits a substantially rectangular shape with two long and two short sides. The short sides are formed in a convex manner to exhibit a curvature bulging outwards. The eccentric top portion 21 is formed symmetrically with respect to two symmetry axes oriented perpendicular to each other. As derivable from FIG. 5, the bottom right hand corner of the short leg of the cover portion 9 exhibits an opening 14 for accommodating the lock 10, namely the cylindric main body 20 of the lock 10. At the same time, the bottom right hand corner of the short leg of the base portion 7 comprises a guiding section 16 for accommodating and guiding the eccentric top portion 21 of the lock 10. The guiding section 16 of the short leg of the base portion 7 exhibits a space 27 having a top wall 24 and two opposing side walls 25 and 26, which are formed parallel to each other, as derivable from FIGS. 7a and 7b. The top wall 24 is divided in two sections, which exhibit approximately the same extension in widthwise direction Q. A first section 24.1, which is provided at the right-hand side, exhibits a first height, and a second section 24.2, which is provided at the left-hand side, exhibits a second height, wherein the second height is higher than the first height. At the interface between the two section of the top wall 24 a curvature 29 is formed.

Figure 9:
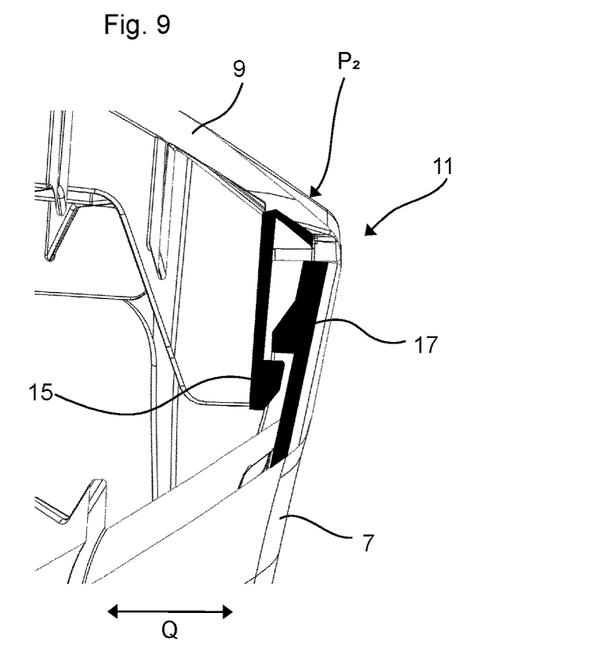
FIG. 9 shows a fixing mechanism for fixing the cover portion to the base portion of the load carrier foot of FIGS. 1 and 2.

FIG. 7a shows the lock 10 in the locked state. In this configuration, the fixing mechanism 11 on the opposite side of the bottom portion of the load carrier foot 1 is engaged, as shown in FIG. 9. The eccentric top portion 21 of the lock 10 is accommodated in the space 27 of the guiding section 16 of the base portion 7, wherein the convex portion of a short side of the eccentric top portion 21 of the lock 10 is engaged with section 24.2 and curvature 29 of the top wall 24. By turning the lock 10 around its rotational axis C to transfer it to the unlocked state shown in FIG. 7b, the convex portion of the short side of the eccentric top portion 21 engages with the left-hand side wall 26 while being disengaged from the top wall 24. Due to the eccentric configuration of the top portion 21 of the lock 10 and the above-described configuration of the guide surface 24, 25, 26 of the guiding section 16 of the base portion, the opening of the lock results in a shifting in width direction Q of the bottom portion of the short leg of the cover portion 9 with respect to the bottom portion of the short leg of the base portion 7. By this sideward movement, the hook 15 of the cover portion 9 is disengaged from the latch 17 of the base portion 7 (see FIG. 9) to release the fixing mechanism 11. Furthermore, by turning the lock 10 around its rotational axis C from the unlocked state shown in FIG. 7b back to the locked state shown in FIG. 7a, the eccentric top portion 21 of the lock 10 engages with the curvature 29 formed between the two sections 24.1, 24.2 with different height of the top wall 24 to shift the bottom portion of the short leg of the cover portion 9 in width direction Q with respect to the bottom portion of the short leg of the base portion 7 to engage the hook 15 of the cover portion 9 with the latch 17 of the base portion 7 and close the fixing mechanism 11. In other words, by closing the lock 10, the bottom portion of the short leg of the cover portion 9 is aligned with the bottom portion of the short leg of the base portion 7, while these two portions are brought into misalignment for disengaging the fixing mechanism 11 by opening the lock 10.

The invention claimed is:

1. A load carrier foot for attaching a load carrying portion to a vehicle, comprising:
    a base portion;
    a cover portion;
    a lock configured to lock the cover portion to the base portion at a first position; and
    a fixing mechanism configured to fix the cover portion to the base portion at a second position spaced apart from the first position, wherein the fixing mechanism is configured to be released by opening the lock,
    wherein the cover portion is configured to be shifted sideways to release the fixing mechanism by opening the lock.

2. The load carrier foot according to claim 1, wherein the fixing mechanism comprises a hook and a latch, wherein the hook is configured to engage with the latch when the fixing mechanism is engaged, and wherein the hook is configured to disengage from the latch by opening the lock.

3. The load carrier foot according to claim 2, wherein the hook is provided at the cover portion, and wherein the latch is provided at the base portion.

4. The load carrier foot according to claim 1, wherein the first position and the second position are provided at opposite side portions of the load carrier foot in a width direction of the load carrier foot.

5. The load carrier foot according to claim 4, wherein the first position and the second position are provided at a bottom portion of the cover portion, the cover portion having an increasing width from a top portion to the bottom portion in a height direction of the load carrier foot.

6. The load carrier foot according to claim 1, wherein the cover portion is configured to be shifted in a width direction of the load carrier foot to release the fixing mechanism by opening the lock.

7. The load carrier foot according to claim 6, wherein the lock is rotatably supported in the cover portion, wherein the lock comprises an eccentric portion and the base portion comprises a guide surface, and wherein the eccentric portion of the lock is configured to be guided by the guide surface of the base portion to shift the cover portion in the width direction of the load carrier foot to release the fixing mechanism by opening the lock.

8. The load carrier foot according to claim 7, wherein the eccentric portion of the lock is configured to be guided by the guide surface of the base portion to shift the cover portion in an opposite direction of the width direction to engage the fixing mechanism by closing the lock.

9. The load carrier foot according to claim 6, further comprising a linkage configured to guide the movement of the cover portion when opening or closing the lock.

10. The load carrier foot according to claim 1, wherein the lock is closed to align the cover portion with the base portion.

11. The load carrier foot according to claim 1, wherein a top portion of the cover portion and the base portion are stationary with respect to each other in a width direction of the load carrier foot when the cover portion is attached to the base portion.

12. The load carrier foot according to claim 11, wherein one of the top portion of the cover portion and the base portion is configured to slide into the other one of the top portion of the cover portion and the base portion to prevent a relative movement of the top portion of the cover portion and the base portion in the width direction of the load carrier foot.

13. The load carrier foot according to claim 12, wherein the top portion of the cover portion and the base portion, when slid into each other, are configured to accommodate an end portion of the load carrying portion.

14. The load carrier foot according to claim 1, wherein one of the base portion and the cover portion comprises a protrusion and the other one of the base portion and the cover portion comprises a complementary groove, and wherein the protrusion is configured to be inserted into the complementary groove to prevent a relative movement of the base portion and the cover portion in a height direction of the load carrier foot.

15. The load carrier foot according to claim 1, wherein the cover portion is configured to be detached from the base portion when the lock is opened by a translational movement in a longitudinal direction of the load carrier foot.

16. The load carrier foot according to claim 1, further comprising an adjustment mechanism with an actuation device, wherein the load carrier foot is configured to be secured to the vehicle by operating the adjustment mechanism, and wherein the cover portion covers the actuation device when attached to the base portion.

17. The load carrier foot according to claim 16, further comprising a first clamping portion and a second clamping portion, wherein a roof rail of the vehicle is configured to be clamped between the first clamping portion and second clamping portion by operating the adjustment mechanism with the actuation device.

18. A load carrier for a vehicle, comprising:
a load carrying portion; and
at least one load carrier foot comprising:
a base portion,
a cover portion,
a lock for locking the cover portion to the base portion at a first position, and
a fixing mechanism for fixing the cover portion to the base portion at a second position spaced apart from the first position, wherein the fixing mechanism is releasable by opening the lock,
wherein the cover portion is configured to be shifted sideways to release the fixing mechanism by opening the lock.

19. A load carrier foot for attaching a load carrying portion to a vehicle, comprising:
a base portion;
a cover portion;
a lock configured to lock the cover portion to the base portion at a first position; and
a fixing mechanism configured to fix the cover portion to the base portion at a second position spaced apart from the first position, wherein the fixing mechanism is configured to be released by opening the lock,
wherein the lock is closed to align the cover portion with the base portion.

* * * * *